Jan. 13, 1959     E. M. BURSTLEIN     2,868,378
ELECTRICALLY HEATED SCREENS Filed Oct. 23, 1953     6 Sheets-Sheet 1

INVENTOR
Eugene M. Burstlein
By Watson, Cole, Grindle & Watson
ATTORNEYS

Jan. 13, 1959  E. M. BURSTLEIN  2,868,378
ELECTRICALLY HEATED SCREENS
Filed Oct. 23, 1953  6 Sheets-Sheet 2

INVENTOR
Eugene M. Burstlein
By Watson Cole, Grindle &
Watson
ATTORNEYS

Jan. 13, 1959 E. M. BURSTLEIN 2,868,378
ELECTRICALLY HEATED SCREENS
Filed Oct. 23, 1953 6 Sheets-Sheet 4

INVENTOR
Eugene M. Burstlein
By Watson, Cole, Grindle &
Watson
ATTORNEYS Jan. 13, 1959 E. M. BURSTLEIN 2,868,378
ELECTRICALLY HEATED SCREENS
Filed Oct. 23, 1953 6 Sheets-Sheet 5

INVENTOR
Eugene M. Burstlein
By Watson, Cole, Grindle &
Watson
ATTORNEYS

US Patent Office
2,868,378
Patented Jan. 13, 1959

2,868,378

ELECTRICALLY HEATED SCREENS

Eugène M. Burstlein, Thionville, France, assignor of one-half to Societe des Acieries de Longwy (Societe Anonyme), Paris, France, a French company Application October 23, 1953, Serial No. 388,006

Claims priority, application France November 3, 1952

11 Claims. (Cl. 209—238)

This invention relates to non-clogging heated screens of the type in which the screening gauze is used as heating means, and particularly to electrically heated screens comprising several panels connected in a new and improved manner to a source of electrical energy.

Screens are already known, in which clogging of the working surface is prevented by electric heating. In some types of known apparatus, the screening surface is divided into a number of longitudinal panels electrically insulated from one another and connected in series. Generally, each screening surface is divided into two parts longitudinally separated by an insulating joint and the two halves of one surface are connected in series by a conductor bar at one end, the other two ends being connected to the respective terminals of the source of current.

In the case of modern screens of great length, this arrangement necessitates the use of high electric voltages, since the length of the electric circuit is at least double that of the screen. In addition, it has the very serious disadvantage of creating, between the two halves of the screening cloth and along the insulating joint, a discontinuous variation of the electric voltage in the transverse direction, which is the more dangerous the higher the voltage used, so that if, for any reason, a metallic object, for example a copper wire coming from the electric firing of the mine and mixed in the coal to be screened, comes into contact with two adjacent parts of the screening surface which are brought to different potentials, a short-circuit occurs, which damages the screening gauze and, by reason of the spark thus produced, may cause a serious accident when screening combustible materials, such as coal fines, the dust of which forms an explosive mixture with the air surrounding the apparatus. In addition, the longitudinal insulating joint or joints are difficult and costly to make, and result in a loss of 20%–40% of the useful surface of the screen, and it is therefore necessary, in order to retain the same screening surface, to increase the external dimensions of the apparatus, which results in an increase in the cost of construction and in the overall dimensions.

The invention has for its object to obviate these disadvantages and to provide improvements in electrically heated screens with a view to reducing for a given output the overall dimensions and the cost of construction of heated screens, reducing the current losses due to the moisture of the material to be screened, reducing the consumption of energy necessary for heating the screening gauze, reducing the cost of maintenance of the screen, eliminating the danger to the personnel which results from the use of high voltages for heating the gauzes, and, in the case of screens of large dimensions, distributing the consumption of energy among the various phases of the distribution circuit in such manner as not to unbalance the said circuit.

This invention permits moreover of obtaining differential heating, or heating which decreases in the longitudinal direction of the screen and the displacement of the products, enabling superheating of the screen towards its downstream end to be avoided and the necessary electrical consumption of energy and the maintenance costs to be reduced. Moreover, it permits of obtaining a balanced differential heating, that is to say, in the case of a multi-phase network, of connecting a common screening apparatus heated in a differential manner to different phases of the network which is advantageous in the case of screens of large dimensions in order not to unbalance the network.

Experience shows that it is desirable for different causes, and particularly for safeguarding the attendants to employ for heating screening gauzes electric currents whose voltage is at most equal to 24 volts between one conductor and the earth, i. e. whose voltage is actually at most equal to 24 volts between terminals in the case of single phase systems, and lower than 42 volts between phases in the case of earthed three phase systems.

In this specification and the appended claims, the term "very low voltage" refers to electric currents whose voltage with respect to the earth does not exceed 24 volts, and with alternating currents whose voltage between two phases is possibly as high as 42 volts in the case of an earthed three phase system.

For voltages higher than these very low voltages, and by reason of the deposition of fine moist dust along the earthed casing of the screen which occurs up to a level higher than the isolator of the screening gauze, a fraction of the current is shunted to the earth through the material to be screened and said moist deposit on account of the electric conductivity of the moist materials, the said fraction being higher in proportion as the voltage of the current is higher. Moreover, on contact with the moist material, the insulation of the screening gauze becomes covered with dust and moisture, and as a result the insulation of the gauze becomes inadequate. Consequently, short circuits are set up between the gauze and the casing of the screen, with all the disadvantages resulting therefrom, such as losses of energy, mechanical damage notably to the bearings, by stray currents, and even clogging of the gauze due to insufficient heating.

On the oher hand, at voltages higher than the very low voltages, since the moist material to be screened is conductive, small sparks may form both between the moving grains and between these grains and the metallic parts of the screen, and these sparks may cause explosions in an atmosphere charged with pulverous combustible material.

Finally, the attendants may touch the live gauzes of the screens, and receive shocks of a dangerous nature if a high potential difference exists between the earth and the part of the screen which has been touched.

For all the aforesaid reasons, it is therefore expedient, in order to minimize the said disadvantages, only to use for heating non-clogging screens very low voltages, as hereinbefore defined.

However, the use of very low voltages for heating screening gauzes, to a temperature of about 40° C., which is considered necessary and sufficient for preventing clogging of the gauzes under the conditions most generally encountered, affords very great difficulties by reason of the great length of modern screens and the use of gauzes woven with steel wires of very small diameter, but of high mechanical and electrical resistance.

In order that this difficulty may be clearly understood, it is sufficient to state that, in order to bring to the required temperature a gauge having a mesh of 2 mm. and consisting of stainless steel wire of a diameter of 0.8 mm., which is employed for screening moist coal fines, it is necessary to apply thereto a potential difference of about 9 volts per metre length, and at least 5 volts per metre length. Now, having regard to the increase in the electrical resistance which the gauge progressively acquires owing to the abrasive action of the materials to be screened, which causes a reduction of the section of the wires, it is advisable not to exceed a potential difference of 18 volts between the ends with a new gauge in order that this potential difference may be progressively increased to the maximum of 24 volts in accordance with the wear of the gauge. Consequently, if it is desired according to the invention not to exceed the voltage of 24 volts which is considered as the limit of the harmless voltages for the good operation of the screen, a gauge having the characteristics hereinbefore given cannot have a length greater than two metres. Now, modern screens are generally longer than two metres.

For each screening problem, there is a gauze length which will be called in this specification "the maximum electrical length" and which cannot be exceeded if it is desired to use a current of very low voltage for heating this gauze, which length is a function of the dimensions of the meshes of the gauze, of the diameter of the wire of which it consists, of its electrical resistivity, of the nature of the material to be screened and of the moisture of this material. This maximum electrical length may be calculated from the following formula:

$$L = 75M \frac{d^2}{\rho(12-m)}$$

in which $L$ = maximum electrical length in metres;
$M$ = parameter dependent upon the nature and the moisture of the material to be screened;
$d$ = diameter of the wire of the gauze in mm.;
$\rho$ = resistivity of the wire in microhms cm.²/cm.;
$m$ = dimensions in mm. of the mesh, that is to say, the space separating two adjacent wires through which the electric current flows.

A non-cloggable electrically heated screening device according to this invention comprises a screening surface formed of a plurality of wire gauze panels juxtaposed in the longitudinal direction of said surface and having a length at most equal to the maximum electrical length above defined, the adjacent ends of any pair of successive panels being transversely secured and connected together, and the two ends of each panel being electrically connected to different terminals of a source of electric energy whose voltage, with respect to the earth, does not exceed 24 volts, whereby said screening surface operates as a single electric conductor along which the voltage varies continuously, and there is no sudden voltage variation between two adjacent portions of said screening surface even when pertaining to different gauze panels.

Thus, if a metallic object accidentally comes into contact with the gauze, the potential difference between two points of the gauze in contact with this object will always be insufficient to set up a spark likely to produce a "dust explosion," or to produce a short-circuit capable of damaging the gauze by local fusion.

When the screens have only a small screening surface of the order of 2 sq. m. for example, it will be advantageous to employ alternating current supplied by a single-phase transformer, because a single-phase transformer is cheaper for a given power than a three-phase transformer. In this case, the various panels will be connected in parallel to the secondary winding, one of the terminals of this winding being connected to the transverse junctions or conductor bars of uneven order which limit the panels longitudinally and the other to the transverse junctions of even order.

In the case of screens having a large screening surface, notably in the case of resonance screens whose surface may reach 15 sq. m. and even more, and with which the power necessary for the heating is relatively high, it will be preferable to employ as source of current of very low voltage a three-phase transformer permitting of distributing the electric load in equal parts between the three phases of the network.

In this case, the number of panels of the screen will be equal to three or to a multiple of three and the successive transverse junctions or conductor bars of the screen will be connected in delta to the three low-tension terminals of the transformer taken in the same order as many times as will be necessary, so that no sudden variations of the voltage will occur at the screening surface, it being possible to connect two or more panels in parallel to each phase.

In the particular case where the number of panels will be equal to 6 or to a multiple of 6, they may be fed by a star arrangement with the aid of a three-phase transformer, as will hereinafter be described.

Whether the transformer employed is single-phase or three-phase, it will advantageously be at variable voltage on the very low voltage side, so that it is possible to adjust the voltage to the electrical resistivity of the wires of the gauze, to the diameter of these wires, to the mesh of the gauze, to the wear of the latter as a function of time, to the nature of the material to be screened and to the moisture thereof, without it being necessary to employ members such as rheostats for adjusting the heating in accordance with the momentary conditions.

The quantity of material supported by the screening surfaces varies from one end of the screen to the other owing to the passage of the grains smaller than the meshes through the gauze. Consequently, the energy required for maintaining the screening surface at the same temperature over the entire length thereof is substantially greater on the side on which the untreated materials are fed than on the side on which the oversize material is discharged. It is therefore possible to effect a substantial saving of electric energy if a differential heating is applied to the various panels, the energy supplied per unit surface of the screening gauze decreasing from the first panel to the last.

In accordance with another feature of the invention, the impedance of the successive panels constituting the screening surface is varied in inverse proportion to the quantity of energy required per unit surface to maintain the panel in question at the chosen temperature.

Experience shows that in the majority of cases it is sufficient to supply to the last panel, per unit surface, only two thirds of the energy required at the first panel, the quantities of energy to be supplied to the intermediate panels being graduated in accordance with a linear function, if desired. For example, in the case of three panels, it will be sufficient to supply per unit surface to the second panel five-sixths, and to the third panel two-thirds, of the energy required at the first panel.

This variation of the impedance of the various panels may be obtained, in order to ensure differential heating thereof, by variation of the diameter of the wires constituting the screening gauze, or by variation of the length of the panels, or by variation of the resistivity of the metal of the wires thereof, or again by simultaneous variation of a number of these factors.

When the impedance of the successive panels is varied by modifying the diameter of the wires from which the gauze is woven, without the other factors being varied, the diameter of the wire of a panel of any order $n$ may be calculated from the following formula:

$$(1) \qquad \frac{d_n^2}{m+d_n} = \frac{d_1^2}{m+d_1} \cdot \frac{W_n}{W_1}$$

in which $d_1$ and $d_n$ are the diameters of the wires of the first and of the $n$th panel; $W_1$ and $W_n$ the differential energies required per unit surface at these two panels, and $m$ the dimension of the mesh of the gauze.

When the impedance of the successive panels is varied by varying the length of the panels without varying the other factors, the length of the panel of order $n$ may be calculated as a function of the length of the first panel by the following formula:

(2) $$L_n = L_1 \frac{\sqrt{W_1}}{W_n}$$

in which $L_1$ and $L_n$ are the respective lengths of the gauzes of the first and of the $n$th panel: $W_1$ and $W_n$ the differential energies required at these panels per unit surface.

If it is desired to vary the impedance of the panels by modifying the resistivity of the metal of the wires constituting the screening surface without acting on the other aforesaid factors, the resistivity of the metal of the wires of the panel of order $n$ may be calculated by the formula:

(3) $$\rho_n = \rho_1 \frac{w_1}{W_n}$$

in which $\rho_1$ and $\rho_n$ are the resistivities of the metal of the wires of the first and of the $n$th panel; $W_1$ and $W_n$ are the differential energies required per unit surface of these panels.

In the case where it is desired to vary the impedance of these various panels by acting simultaneously on at least two of the aforesaid factors, those relating to the panel of order $n$ will be linked with the corresponding factors of the first panel by the relation (4) $$\frac{d_n^2}{\rho_n(m+d_n)L_n^2} = \frac{d_1^2}{\rho_1(m+d_1)L_1^2} \cdot \frac{W_n}{W_1}$$

in which: $d_1$ and $d_n$ are the respective diameters of the wires of the first and of the $n$th panel; $\rho_1$ and $\rho_n$ are the electric resistivities of these wires; $L_1$ and $L_n$ are the respective lengths of the panels; $m$ the dimension of the mesh of the gauze, and $W_1$ and $W_n$ the differential energies required at these two panels per unit surface.

The progressive variation of the energy consumption from one panel to the other over the entire length of the screen, in the case of the heating with the aid of three-phase current, has a disadvantage which it is precisely the object of the use of three-phase current to obviate, namely the unbalance of the phases of the network.

In accordance with another feature of the invention, this disadvantage may be remedied by the application of "balanced differential heating," which consists in varying the quantity of energy supplied to the panels per unit surface, while supplying the same quantity of energy to each panel.

In order to obtain this balanced differential heating of the various panels constituting the screening surface, the impedance per unit length of each panel will be varied, and the lengths of these panels will be simultaneously increased from the side on which the materials are fed to the point of delivery of the oversize materials.

The length of the various panels may in this case be calculated as a function of the length of the first panel from the formula:

(5) $$L_n = L_1 \frac{W_1}{W_n}$$

in which $L_1$ and $L_n$ are the respective lengths of the gauzes of the first and $n$th panels; $W_1$ and $W_n$ the differential energies required at these panels per unit surface.

At the same time, the impedance per unit length will be varied by modifying the diameter of the wires of the gauze of the panels, or by using metals of different resistivities for these wires, or again by varying both these factors.

In the first case, in which the diameter of the wires is varied without modifying the resistivity thereof, the diameter of the wires of the $n$th panel may be calculated as a function of that of the wires of the first panel from the formula:

(6) $$\frac{m+d_n}{d_n^2} = \frac{m+d_1}{d_1^2} \cdot \frac{W_n}{W_1}$$

in which $d_1$ and $d_2$ are the respective diameters of the wires of the first and of the $n$th panel; $W_1$ and $W_n$ are the quantities of differential energy per unit surface which are necessary for these panels; $m$ is the mesh of the gauzes of the screen.

In the case where the resistivity of the wires is varied without their diameter being changed, the resistivity of the wires of the $n$th panel may be calculated as a function of that of the first panel by the formula:

(7) $$\rho_n = \rho_1 \frac{W_1}{W_n}$$

in which $\rho_1$ and $\rho_n$ are the resistivities of the metal of the wires of the gauzes of the first and $n$th panels; $W_1$ and $W_n$ are the quantities of different energy per unit surface necessary for these panels.

In the general case where the two aforesaid factors are simultaneously varied, the resistivity and the diameter of the wires of the panel of order $n$ will be related to the resistivity and to the diameter of the wires of the first panel by the relation:

(8) $$\frac{\rho_n(m+d_n)}{d_n^2} = \frac{\rho_1(m+d_1)}{d_1^2} \cdot \frac{W_n}{W_1}$$

in which $\rho_1$ and $\rho_n$ are the resistivities of the metal of the wires of the gauzes of the first and $n$th panels; $d_1$ and $d_n$ are the respective diameters of the wires of the first and $n$th panels; $W_1$ and $W_n$ are the quantities of differential energy per unit surface required for these panels; $m$ is the mesh of the gauzes of the screen.

Naturally, in the case of a screen of great length comprising a number of series of panels connected in delta-parallel to the three phases of a three-phase transformer, the screening surface may be divided in the direction of its length into series of three panels, the length of the panels increasing in each series, but each series of panels being independent of the others from the viewpoint of its length. In the case of six panels, for example, the first three panels will be given variable lengths calculated by the Formula 5, so as to supply to each one, by simultaneously modifying their impedance per unit length, a quantity of energy equal to that necessary for the first panel. The fourth panel will be given any suitable length $L_4$ and the lengths of the fifth and sixth panels will be calculated by the Formula 5 which, in this case will take the form:

$$L_n = \frac{W_4}{W_n} L_4$$

the impedances per unit length being simultaneously adjusted to the required values. In this way, the quantity of energy supplied by each phase will be equal and the network will not be unbalanced.

In addition to the saving of energy afforded by the differential heating according to the invention, whether it will be balanced or not, another advantage of the subdivision into transverse panels of the screening gauze resides in a substantial reduction of the maintenance costs. In fact, the wear on the screening surface is greater on the side on which the materials to be screened are introduced than on the side on which the oversize material is discharged. Moreover accidents which may occur to the screening gauze, such for example as tearing due to the fall of a heavy body mixed with the raw materials, also occur more frequently on the side on which these materials are introduced.

Now, in a screen according to the invention, the first panel, at which the wear and the danger of accidents are greatest, is precisely that which comprises, during simple differential heating, the coarsest wires or the wires whose length during balanced differential heating is smallest. In the two causes, the maintenance costs will be reduced, either by reason of the increase in the life of the first panel or by reason of its smaller length.

Moreover, since no insulation is required between two successive panels owing to the absence of any sudden variation of the voltage between two panels, the inactive surface of the screen is reduced to a minimum, this surface consisting, moreover, of the very small transverse joints by which the electric connections between the panels are made.

In the foregoing, it has been assumed that the mesh of the screening gauze is constant from one panel to the other, but there is nothing to prevent a number of separations into different grain sizes being effected in a single operation on the screens of great length, by providing along the screening surface, panels having different meshes, the whole of the screening surface being heated by one single-phase or three-phase transformer.

Also, by applying the principles of simple differential heating, or of the balanced differential heating hereinbefore specified, it is possible to effect the heating of all the stages with a single transformer on a screen comprising a number of superimposed stages. In the case of a screen comprising a number of stages, the quantity of energy per unit surface necessary at the last panel of the upper stage is smallest, and that necessary at the first panel of the lower stage is greatest. The total screening surface, formed by the surfaces of the various stages, will then be arranged as a single continuous electric conductor, in which the various panels succeed one another for each stage from the first to the last, the stages being taken in the ascending order, whereby it is possible to give each panel its order for the calculation of the characteristic factors of the panel.

In both cases, whether the screen be a single-stage screen having different meshes or one comprising superimposed stages, it will be possible to calculate the various factors for a panel of order $n$ by replacing in the Formulas 1, 4, 6 and 8 above $(m+d_n)$ by $(m_n+d_n)$ and $(m+d_1)$ by $(m_1+d_1)$, $m_1$ and $m_n$ being the respective meshes of the first and $n$th panels.

In the case of screens of variable mesh, the advantage afforded by the invention is further increased in the sense that the energy required for the heating of the last panel is much smaller than that which must be supplied to the first of them, and the differential heating therefore permits of effecting a more considerable saving of energy.

The description which follows with reference to the accompanying drawings, which are given by way of non-limitative example, of a number of methods of coupling screening panels fed with single-phase current and with three-phase current and constructional details regarding the introduction of the energy into the gauzes, the electric insulation of the latter from the casing of the screen, the method of tensioning the gauzes and the automatic compensation for the expansions of the gauzes as a function of temperature, will enable the manner in which the invention can be carried into effect to be readily understood, the details appearing both from the drawings and from the text naturally forming part of the said invention.

Figure 1:
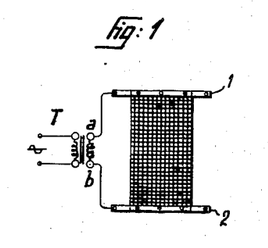
Figure 1 is a diagram of a known screen having only one panel electrically connected to a single phase transformer.

The simplest known type of electrically heated screen, which usually has relatively small dimensions and whose screening surface is mechanically tensioned in the longitudinal direction (Figure 1), comprises a single panel, the two ends 1 and 2 of which are electrically connected through flexible conductors $a$ and $b$, respectively, to the secondary winding of a single phase transformer T, usually with the insertion in the circuit of a rheostat mounted in series or another controlling means.

In a prior construction having a greater screening capacity, the screen plate is divided in two longitudinal panels separated longitudinally by an insulating joint which panels are connected in series by a conductor bar at one end, the two other adjacent ends being respectively connected to the terminals of the secondary coil of a heating transformer.

This arrangement has the serious objection of creating, between the two halves of the screen gauze and along the insulating joint, a discontinuous variation of the electrical voltage in the transverse direction which may be capable of causing short-circuits damaging the screening gauze, or of serious accidents when screening combustible materials, as it has been explained hereinabove.

In another known type of electrically heated screen, the screening surface is again divided in two longitudinal panels, but these panels are electrically connected along the middle joint which is connected by a flexible conductor to one of the terminals of the feeding transformer, whilst the two sides of the screen carrying respectively a longitudinal connecting bar are connected in parallel, by flexible conductors to the other terminal of said transformer. In this case, there is no sudden fall of potential along the middle joint.

In these two known constructions, the current which flows through the gauzes, longitudinally in the first case and transversely in the second case, being constant over the whole length of the screen, the downstream end of the latter is superheated because it is less cooled by the material to be screened.

The first construction requires a relatively high feeding voltage, or the use of a screen of small dimensions, the length of the screen heating circuit being substantially double that of the screen. The second construction permits of using very low voltages, the length of the heating circuit being only substantially half of the width of the screen, but it is costly to produce on account of the three conductor bars each having the full length of the screen surface and it leads, like the former, to a waste of energy by overheating the downstream part.

Figure 2:
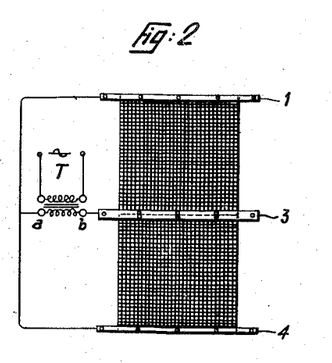
Figures 2 and 3 show diagrammatically screens having a number of panels extending over the full width of the screening surface, mechanically tensioned in the longitudinal direction, and connected in parallel with the secondary winding of a single phase transformer.

If the screen comprises a screening surface whose length is greater than the maximum electrical length admissible at very low voltages, which is generally the case, this screening surface will be composed according to this invention of two or more transverse panels, each having a length smaller than said maximum electrical length. These panels are electrically connected in parallel in the following manner:

In the case of two panels (Figure 2), these panels are electrically connected together at 3, so that the whole screening surface behaves as a single conductor without electrical discontinuity. The end 1 of the first panel and the end 4 of the second panel are connected by flexible conductors to the terminal $a$ of the secondary winding of the single-phase transformer T at very low voltage, and the junction at 3 of these two panels is connected to the terminal $b$ of the secondary winding of this same transformer. The heating may be differential and decrease in the direction of travel of the materials to be screened, the first panel being provided with coarser wires and the second panel with finer wires as hereinbefore explained, or the second panel may comprise wires of higher electrical resistivity, or again it may be given a greater length than the first panel.

Figure 3:
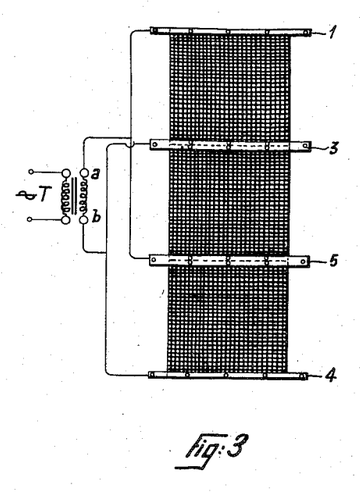

In the case of a screen mechanically tensioned in the longitudinal direction, the screening surface of which must be subdivided into three transverse panels (Figure 3) each having a length smaller than the maximum electrical length, these three panels will be electrically connected in parallel in the following manner:

The contacting ends of the panels will be electrically connected at 3 and 5 so that the whole screening surface behaves as a single conductor without electrical discontinuity. The end 1 of the first panel and the junction 5 of the second and third panels are connected by flexible conductors to the terminal $a$ of the secondary winding, at very low voltage, of the single-phase transformer T of variable voltage.

The junction 3 of the first and second panels and the end 4 of the third panel are connected in the same manner to the terminal $b$ of the secondary winding of the same transformer. The heating may be differential and decrease in the direction of travel of the materials to be screened, the wires either being given a decreasing diameter or an increasing resistivity or an increasing length from the first panel to the third.

The coupling in parallel with the terminals of a transformer at very low voltage, of successive panels constituting the screening gauze and the length of which is smaller than the maximum electrical length is naturally applicable to any desired number of panels with single-phase current.

However, for modern screens having a large screening surface and great length, it is almost always expedient to employ three-phase current in order that the balance of the electric network may not be destroyed. In this case, the screening surface will be subdivided into a number of transverse panels equal to three, or to a multiple of three, so as to give each of these panels a length smaller than the maximum electrical length admissible with currents at very low voltage.

These panels will be electrically connected together in such manner that the whole screening surface acts as a single continuous electrical conductor in which no sudden and harmful variation of the voltage occurs at any point. The various panels will then be connected in delta (simple delta or delta-parallel) with a three-phase transformer at very low voltage.

Figures 4, 5, 6:
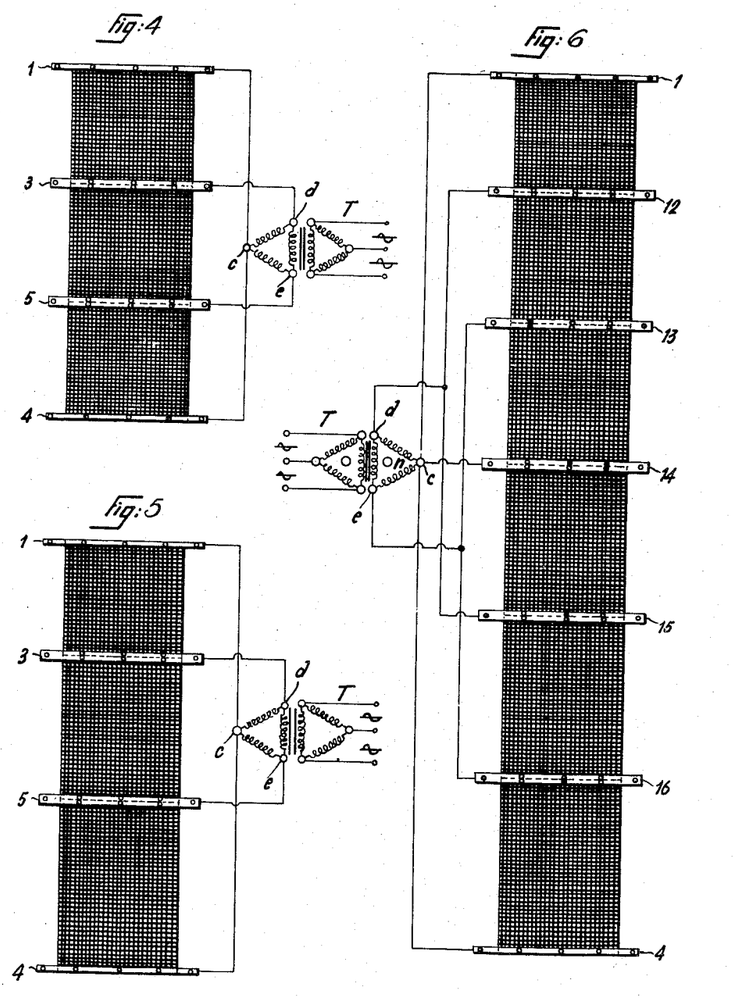
Figures 4 to 6 relate to the case of panels mechanically tensioned in the longitudinal direction and fed with the aid of a three-phase transformer.
Figure 7:
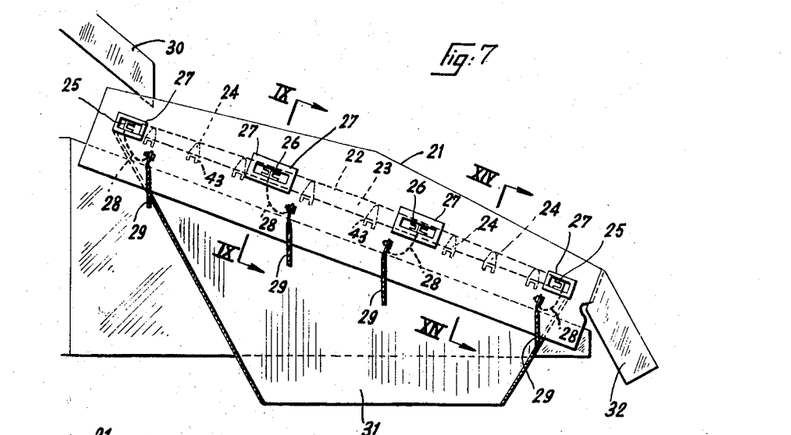
Figure 7 is an overall diagrammatic view of a screen provided with an electrically heated gauze comprising three panels.
Figure 8:
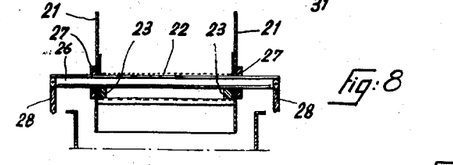
Figure 8 is a section on a smaller scale, taken along the lines IX—IX of Figure 7.
Figure 9:
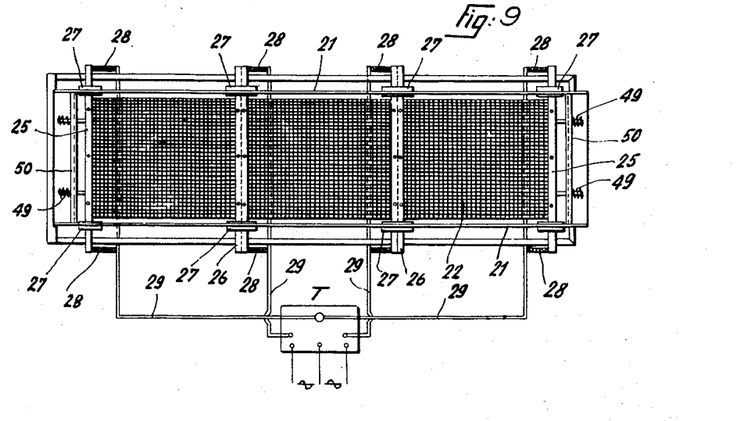
Figure 9 is a plan view of the screen illustrated in Figure 7.

Figure 4 shows diagrammatically an example of the electrical connections for a screen comprising three transverse panels. These panels are electrically connected together at 3 and 5. The ends 1 of the first panel and 4 of the third panel are connected by flexible conductors to the terminal $c$ of the secondary winding of the variable-voltage transformer. The junction 3 of the first and second panels and the junction 5 of the second and third panels are connected to the terminals $d$ and $e$ respectively of the secondary winding of this same transformer.

The said screen may be provided with differential heating by adaptation of the diameter or the electrical resistivity of the wires of the various panels. However, in this case, there will not be a perfect balancing of the phases.

Figure 5 shows the same screen provided with balanced differential heating. The only differences as compared with the preceding figure reside in a progressive increase of the length of the panels and in a reduction of the impedance per unit length in the direction of travel of the products to be screened, that is to say, from the first panel to the third.

In the case of a very long screen (Figure 6), for example a modern resonance screen of high capacity, the screening surface may be subdivided into 6 panels connected in delta-parallel with a variable-voltage three-phase transformer. The various panels are electrically joined at 12, 13, 14, 15 and 16.

The end 1 of the first panel, the junction 14 of the third and fourth panels and the end 4 of the sixth panel are connected to the terminal $c$ of the secondary winding of the transformer. The junction 12 of the first and second panels and the junction 15 of the fourth and fifth panels are connected to the terminal $d$ of the secondary winding of the same transformer. The junction 13 and 16 are connected to the terminal $e$ of the secondary winding of the same transformer. The said screen, by reason of the considerable electrical power employed, is arranged for balanced differential heating, the panels having different lengths with different impedance per unit length.

It is also possible to connect the various panels of the screen of Figure 6 in star with the transformer T. For this purpose, it is sufficient to connect the ends 1 and 4 of the first and sixth panels to the terminal $c$ of the secondary winding of the transformer, to connect the junctions 13 and 15 to the terminals $d$ and $e$ respectively of this same transformer, while the junctions 12, 14 and 16 of the panels will be connected to the neutral terminal $n$ of this transformer.

In the constructional form of the screen according to the invention as shown in Figures 7 to 9, 21 is the casing of the screen, 22 the screening surface, and 23 and 24 the longitudinal and transverse insulating supports of this surface. The ends of the panels are fixed, either to automatic tensioning carriages 25 at the ends of the screening surface, or to intermediate junction carriages 26 for the connection of the panels, the tensioning and junction carriages being maintained in insulating supports 27 as will hereinafter be described. Flexible conductors 28 introducing the electric energy into the tensioning and junction carriages are connected to the conductors 29 leading to the secondary winding of the transformer T. The screen is fed by means of a chute 30, while a discharge hopper 31 receives the material which has passed through the screen, the oversize being discharged through the chute 32.

Figure 10:
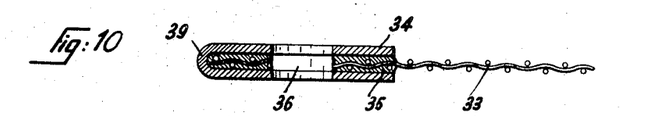
Figure 10 is a section through one terminal eye of a panel.

By reason of the very low voltages employed, the electric energy is introduced at the ends of the panels at considerable current strength which may reach several thousand amperes in the case of screens of a certain width. Particular care must therefore be taken in the construction of the eyes 39 bounding two opposite ends of each panel (Figure 10).

The end of the screening gauze 33 is surrounded by a bent-over metal strip 34 and these two elements, after having been suitably pickled, are intimately welded together by pouring in a suitable filler metal 35 in such manner as to form a single block. The terminal eye 39 thus formed has formed therein a number of holes 36 permitting of securing the panel to the tensioning or junction carriages 25 and 26.

Each of the latter consists of a profiled metal bar arranged to slide in the longitudinal slot 37 (Figures 11 and 12) in an insulating block 27 secured to the side wall 21a of the casing.

Figure 11:
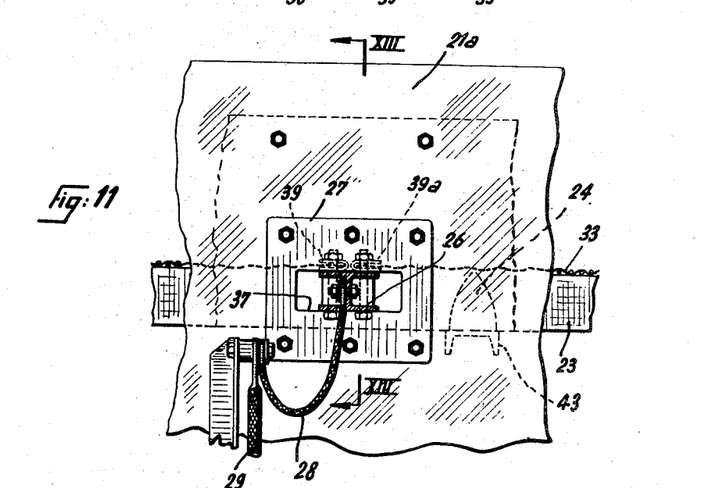
Figure 11 is a fragmentary side elevation showing a method of electrically connecting the ends of two adjacent panels and the manner in which they are secured to a junction carriage.
Figure 12:
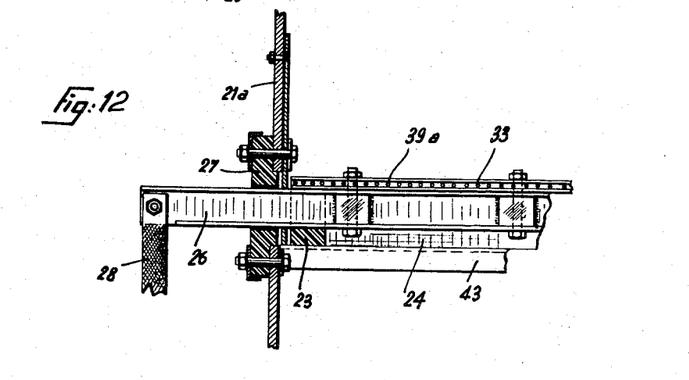
Figure 12 is a fragmentary section taken along the line XIII—XIII of Figure 11.

The two terminal eyes 39 and 39a of the two panels to be joined are secured by means of bolts to the said junction carriage 26, which effects the electrical connection between the two panels. Secured to the end of the junction carriage 26 extending laterally from the casing are one or more flexible conductors 28 permitting of making the electrical connection with one of the secondary terminals of the transformer through conductors 29.

Figure 13:
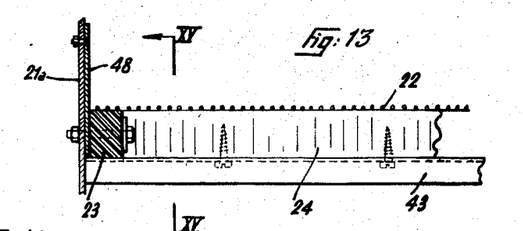
Figure 13 is a fragmentary transverse section along the line XIV—XIV of Figure 7
Figure 14:
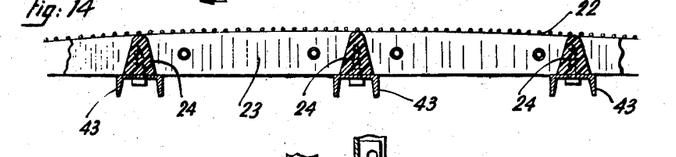
Figure 14 is a fragmentary longitudinal section along the line XV—XV of Figure 13, showing how the screening surface can be insulated from a metal casing of the screen.

The cross stays 43 (Figures 12 and 13) of the flanks 21a of the casing support the screening surface 22 through suitably profiled insulating supports 24, which may consist of wood, or plastic material or of rubber. Laterally, that is to say, along the flanks 21a of the casing, the screening surface is supported by insulating supports 23 of wood, plastic material or rubber. In addition, the gauze is laterally insulated from the flank 21a of the casing by plates 48 of insulating material.

Figure 15:
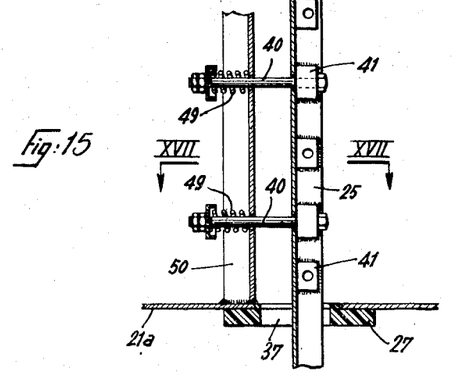
Figure 15 is a plan view showing a detail of one end of the casing of the screen.
Figure 16:
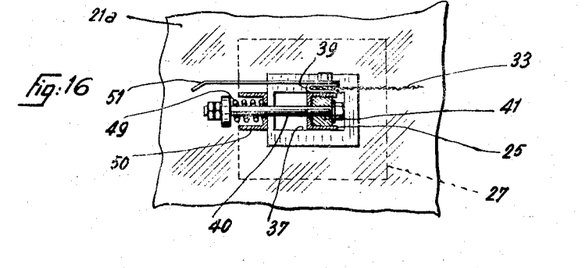
Figure 16 is a section along the line XVII—XVII of Figure 15.
Figure 17:
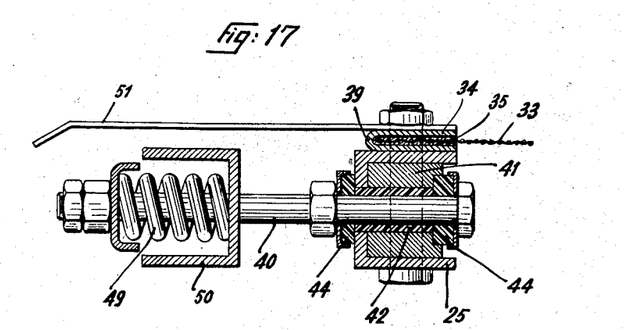
Figure 17 is a section on a larger scale, similar to that shown in Figure 16.

The automatic compensated tensioning of the screening surface can be effected by the arrangement illustrated in Figures 15, 16 and 17.

The terminal eye 39 of the first and third panels of the screening surface 22 is secured to the tensioning carriage 25, which is arranged to slide in the longitudinal slots 37 in two insulating blocks 27 secured to the flanks 21a of the casing. The insulated movable carriage 25 is connected to one terminal of the secondary winding of the transformer through a flexible conductor (not shown) exactly in the same manner as the junction carriages 26.

Secured to the said carriage 25 are a number of tension rods 40 which are insulated with respect to the carriage as indicated in Figure 17. For this purpose, the rod 40 is secured in a steel block 41 and the electric insulation is afforded by the insulating tube 42 and the insulating washers 44.

The pull on the rods 40 is exerted by springs 49 bearing against the cross member 50 fast with the casing.

The sheet-metal deflector 51 has the object of preventing the material to be screened from passing into the gap between the movable tensioning carriage 25 and the fixed cross member 50 fast with the casing. With this system, the mechanical tensioning of the screening surface is maintained constant regardless of the variations of the length of the panels under the effect of the temperature variations due to the electric heating.

It will be obvious that modifications may be made to the constructional form of the screen hereinbefore described, notably by substitution of equivalent technical means, without departing from the scope of the present invention.

Figure 18:
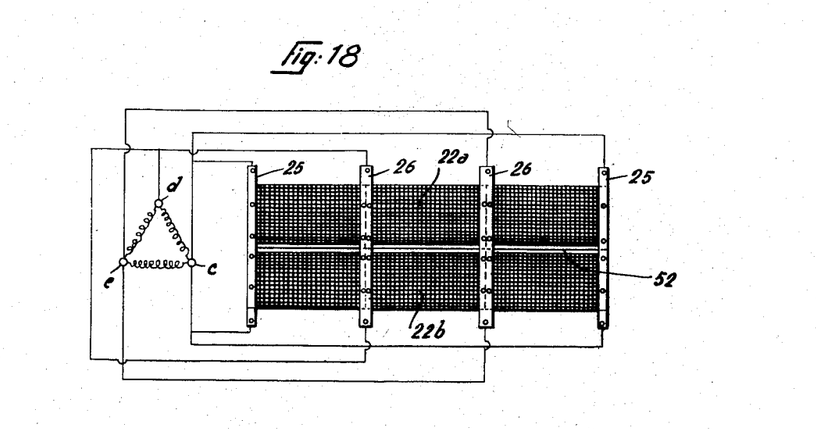
Figure 18 is a diagram showing how a large width screening surface may be divided into transverse panels composed each of several portions.

Particularly, in cases of very large screens, it may happen that the width of the screening gauze should be greater than the maximum width of the usually available gauzes. In said cases, each transverse panel may be divided into several portions (see Fig. 18) by longitudinal members 52 preferably made of insulating material, the several portions of each transverse panel having exactly the same length and being secured by their extremities to the same terminal eye in turn secured to the same intermediate junction carriage 26 or to the same automatic tensioning device 25, and being thus connected in parallel between the same terminals of the low voltage transformer. In Figure 18 is shown one example of this disposition in which each transverse panel is divided into two portions connected in parallel between the terminals c—d, d—e, and e—c respectively of a three phase delta low voltage transformer, but it is obvious that each transverse panel may be divided into more than two panels, according to the width of the screen, and that said division may be made with other types of screens comprising a number of transverse panels different from three. It is to be noted also, that along the dividing members 32 there is substantially no difference of potential between adjacent portions of the parts 22a and 22b of one transverse panel and consequently that there is no danger of flashing for a spark in the case of a metallic object coming into contact simultaneously with said part.

What I claim is:

1. A non-cloggable longitudinally electrically heated screening device comprising a screening surface formed of a plurality of wire gauze panels juxtaposed in the longitudinal direction of said surface, said panels having an impedance per unit surface which increases in the direction of travel of the materials to be screened; coupling means for transversely securing and electrically connecting together the adjacent ends of any two successive gauze panels; conducting means secured to the free transversal ends of the first and last panels; an electrical source of heating energy and means for electrically connecting said conducting means and said coupling means successively to different terminals of said source, whereby said panels are differentially heated and the energy input per unit surface of panel decreases in the direction of travel of said materials.

2. A non-cloggable longitudinally electrically heated screening device as claimed in claim 1 in which said panels are all of the same length and are made with wire gauzes of the same mesh whose wires have the same resistivity but diameters lower and lower from panel to panel and related by the formula $$\frac{d_n^2}{m+d_n} = \frac{d_1^2}{m+d_1} \cdot \frac{W_n}{W_1}$$

where $d_1$ and $d_n$ are the diameters of the wires of the 1st and $n$th panels; $W_1$ and $W_n$ are the differential heating energies required per unit surface of these panels; $m$ is the distance in mm. separating two adjacent wires of the gauze whereby the impedance per unit surface of said panels increases from panel to panel in the direction of travel of the materials to be screened, the energy input per unit surface decreases in said direction and said panels are differentially heated.

3. A non-cloggable longitudinally electrically heated screening device as claimed in claim 1 in which said panels are made from wire-gauzes having the same mesh and whose wires have a constant diameter and resistivity, said panels having different lengths related by the formula $$L_n = L_1 \sqrt{\frac{W_1}{W_n}}$$

where $L_1$ and $L_n$ are the lengths of the 1st and $n$th panels respectively; $W_1$ and $W_n$ are the differential heating energies required per unit surface of these panels.

4. A non-cloggable longitudinally electrically heated screening device as claimed in claim 1 in which said panels are all of the same length and are made with wire-gauzes of the same mesh obtained from wires of the same diameter but of different resistivities related by the formula $$\rho_n = \rho_1 \frac{W_1}{W_n}$$

where $\rho_1$ and $\rho_n$ are the resistivities of the wires of the 1st and $n$th panels respectively; $W_1$ and $W_n$ are the differential energies required per unit surface of these panels.

5. A non-cloggable longitudinally electrically heated screening device as claimed in claim 1 in which said panels have all the same mesh-size and impedances per unit surface increasing from panel to panel in the direction of travel of the material to be screened, the characteristic factors of said panels, i. e. diameters of the wires, resistivities of said wires and lengths of said panels being related by the formulae $$\frac{d_1^2}{\rho_n(m+d_n)L_n^2} = \frac{d_1^2}{\rho_1(m+d_1)L_1^2} \cdot \frac{W_n}{W_1}$$

$$L = L_1 + L_2 + L_n$$

where: $d_1$ and $d_n$ are the respective wire diameters in mm. of the 1st and $n$th panels; $\rho_1$ and $\rho_n$ are the electrical resistivities of the respective wires of these panels; $m$ is the mesh of the screening surface in mm.; $L_1$ and $L_n$ are the respective lengths of these panels; L is the length of the total screening surface; $W_1$ and $W_n$ are the differential energies required per unit surface of these panels.

6. An electrically longitudinally heated screening device as claimed in claim 1 further comprising, a casing encompassing said screening surface, said casing comprising a pair of longitudinal members disposed on either side of said screening surface and transverse members securing said longitudinal members in spaced relationship; insulating plates disposed on the inner sides of the members of the casing for insulating said screening surface and the material to be screened from said casing; a plurality of profiled insulating bars longitudinally and transversely disposed inside said casing, and forming an insulating support for said wire-gauze panels; insulating blocks provided with an oblong aperture mounted in oppositely disposed relation on either longitudinal members of said casing, said blocks forming guides for said junction and tensioning carriages sliding therein, said carriages being constituted by metal profiles having at least one upper flat surface adapted to support said terminal eyes of said panels bolted thereon; automatic tensioning means at each extremity of said screening surface, said tensioning means comprising a transverse metallic member secured to each longitudinal side of said casing, a plurality of tensioning rods passing through suitable apertures provided in said transverse metallic member, said rods being each secured by one of their extremities to one of said tensioning carriages, with insulating means therebetween, a tensioning spring on each of said rods, said spring abutting on said transverse metallic member and being controllably compressed by a nut and an associated spring washer; whereby said screening surface is automatically tensioned at each of its extremities by said tensioning springs regardless of the variations of its length due to temperature variations.

7. An electrically longitudinally heated screening device according to claim 1 for grading material such as moist coal fines or the like said device comprising an input chute, a screening surface associated with said chute, a hopper disposed below said screening surface, a delivery chute associated with the outlet end of said screening surface said screening surface being constituted by electrically-heated transverse wire-gauze panels abutting longitudinally on each other and secured by their abutting ends on conducting transverse junction-carriages, tensioning-carriages in electrically conducting material provided one at each extremity of said screening surface for securing the free ends of the first and last panels and longitudinally tensioning the whole screening surface, an electric transformer for supplying said panels with electric heating energy at a variable voltage, and flexible cables connecting said tensioning carriages and said junction carriages taken in succession along the screening surface to the different terminals of said secondary winding of the transformer taken in a given order, the number of said transverse wire-gauze panels being a multiple of the phases of the transformer, whereby said conductors and said cables connect the same number of panels to each phase of said transformer.

8. An electrically longitudinally heated screening device as claimed in claim 1 in which said transverse wire-gauze panels are provided along their transverse extremities with terminal eyes each formed of a U-section metal strip enclosing one extremity of said panels and soldered thereon, said eyes having a plurality of holes spaced along their lengths, and bolts engaged through said holes and said tensioning carriages and said junction carriages respectively for securing said panels thereto and applying said terminal eyes in good electric contact on said carriages.

9. An electrically longitudinally heated screening device comprising a screening surface formed of a plurality of wire gauze panels juxtaposed in the longitudinal direction of said surface, said panels having different meshes and an impedance per unit surface which increases in the direction of travel of the materials to be screened by having simultaneously at least another different characteristic factor, i. e. diameter of the wires, resistivity of said wires and length of said panels, the said factors of the different panels being related by the formula:

$$\frac{d_n^2}{\rho_n(m_n+d_n)L_n^2} = \frac{d_1^2}{\rho_1(m_1+d_1)L_1^2} \cdot \frac{W_n}{W_1}$$

wherein: $d_1$ and $d_n$ are the respective wire diameters in mm. of the 1st and $n$th panels; $\rho_1$ and $\rho_n$ are the electrical resistivities of the respective wires of these panels; $m_1$ and $m_n$ are the mesh in mm. of the respective panels; $L_1$ and $L_n$ are the respective lengths of the panels; $W_1$ and $W_n$ are the differential energies required per unit surface of these panels; coupling means for transversely securing and electrically connecting together the adjacent ends of any two successive gauze panels; conducting means secured to the free transversal ends of the first and last panels; an electrical source of heating energy and means for electrically connecting said conducting means and said coupling means successively to different terminals of said source, whereby said screening device is adapted to grade the material to be screened into different grain sizes in a single operation and said panels are differentially heated.

10. A non cloggable longitudinally electrically heated screening device comprising a screening surface formed of a plurality of wire gauze panels juxtaposed in the longitudinal direction of said surface, said panels having an impedance per unit surface which increases in the direction of travel of the materials to be screened, the lengths of the successive panels further simultaneously increasing in the same direction according to the formula $$L_n = L_1 \frac{W_1}{W_n}$$

where $L_1$ and $L_n$ are the respective lengths of the first and $n$th panels, and $W_1$ and $W_n$ the respective differential energies required per unit surface of these panels; coupling means for transversely securing and electrically connecting together the adjacent ends of any two successive gauze panels; conducting means secured to the free transversal ends of the first and last panels; an electrical source of heating energy and means for electrically connecting said conducting means and said coupling means successively to different terminals of said source, whereby said panels are differentially heated whilst the quantity of energy supplied to each panel remains constant.

11. A non-cloggable longitudinally electrically heated screening device as claimed in claim 10, wherein said panels forming said screening surface have different meshes, and in which the impedance per unit length of each of said panels is varied by modifying the diameter and resistivities of the wires of each of said panels with respect to the diameter and resistivity of the wires of the adjacent panels, the resistivity and diameters of the said wires forming the 1st and $n$th panels being related by the formula:

$$\frac{\rho_n(m_n+d_n)}{d_n^2} = \rho_1 \frac{(m_1+d_1)}{d_1^2} \cdot \frac{W_n}{W_1}$$

wherein $\rho_1$ and $\rho_n$ are the respective resistivities of the wires forming the 1st and $n$th panels; $d_1$ and $d_n$ are the respective diameters of the wires of said panels expressed in mm.; $m_1$ and $m_n$ are the mesh (expressed in mm.) of said panels; $W_1$ and $W_n$ are the quantities of differential energy required per unit surface of said 1st and nth panels; whereby said screening device is adapted to grade the material to be screened into different grain sizes in a single operation.

References Cited in the file of this patent

UNITED STATES PATENTS

| | | |
|---|---|---|
| 1,710,795 | Arms | Apr. 30, 1929 |

FOREIGN PATENTS

| | | |
|---|---|---|
| 247,791 | Great Britain | Feb. 25, 1926 |
| 665,313 | Great Britain | Jan. 23, 1952 |

UNITED STATES PATENT OFFICE
Certificate of Correction

Patent No. 2,868,378                                                                                      January 13, 1959

Eugène M. Burstlein

It is hereby certified that error appears in the printed specification of the above numbered patent requiring correction and that the said Letters Patent should read as corrected below.

Column 5, line 15, Formula (3), for the numerator "$w_1$" read —$W_1$—; column 12, line 73, claim 5, in the numerator of the formula, for "$d_1{}^2$", first occurrence, read —$d_n{}^2$—; column 14, line 18, claim 9, in the denominator of the formula, the left-hand portion should read —$\rho_n(m_n+d_n)L_n{}^2$—.

Signed and sealed this 8th day of March 1960.

[SEAL]

Attest:
KARL H. AXLINE,
*Attesting Officer.*

ROBERT C. WATSON,
                                                        *Commissioner of Patents.*